United States Patent
Hasuka et al.

(10) Patent No.: US 8,071,249 B2
(45) Date of Patent: Dec. 6, 2011

(54) FUEL CELL SYSTEM AND MOBILE ARTICLE

(75) Inventors: Yoshinobu Hasuka, Toyota (JP); Yoshiaki Naganuma, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 15 days.

(21) Appl. No.: 12/840,592

(22) Filed: Jul. 21, 2010

(65) Prior Publication Data

US 2010/0285382 A1    Nov. 11, 2010

Related U.S. Application Data

(62) Division of application No. 12/085,167, filed as application No. PCT/JP2006/324038 on Nov. 24, 2006, now abandoned.

(30) Foreign Application Priority Data

Dec. 12, 2005 (JP) .................................. 2005-358129
May 11, 2006 (JP) .................................. 2006-132985

(51) Int. Cl.
  *H01M 8/04* (2006.01)
(52) U.S. Cl. ........ 429/446; 429/428; 429/430; 429/431; 429/432; 429/443; 429/444
(58) Field of Classification Search .................. 429/428, 429/430–432, 443, 444, 446
  See application file for complete search history.

(56) References Cited

U.S. PATENT DOCUMENTS

| 3,514,681 | A | 5/1970 | Dorn et al. |
| 6,755,077 | B2 | 6/2004 | Clingerman et al. |
| 7,550,219 | B2 | 6/2009 | Uozumi |
| 2004/0067399 | A1 | 4/2004 | Kobayashi et al. |
| 2005/0118475 | A1 | 6/2005 | Ueda et al. |
| 2005/0147863 | A1 | 7/2005 | Hiramatsu et al. |
| 2005/0258385 | A1 | 11/2005 | Miller et al. |
| 2006/0083967 | A1 | 4/2006 | Sakai |

FOREIGN PATENT DOCUMENTS

| CN | 1692517 A | 11/2005 |
| JP | 03-108268 | * 5/1991 |
| JP | 03-108268 A | 5/1991 |
| JP | 6-275300 A | 9/1994 |
| JP | 9-266004 A | 10/1997 |
| JP | 2003-151602 A | 5/2003 |
| JP | 2004-139984 A | 5/2004 |
| JP | 2004-179000 A | 6/2004 |

(Continued)

OTHER PUBLICATIONS

English language translation of JP 03-108268, Goto, May 1991.*

*Primary Examiner* — Jerry Lorengo
*Assistant Examiner* — Jared Wood
(74) *Attorney, Agent, or Firm* — Kenyon & Kenyon LLP (57) ABSTRACT

The fuel cell system is provided with a fuel cell, a fuel supply system for supplying fuel gas to the fuel cell, an injector for regulating the gas state upstream in the fuel supply system and supplying the gas downstream, and control means for driving and controlling the injector at a predetermined drive cycle. The control means sets the working state of the injector in response to the operating state of the fuel cell.

14 Claims, 5 Drawing Sheets

FOREIGN PATENT DOCUMENTS

| | | |
|---|---|---|
| JP | 2004-342479 A | 12/2004 |
| JP | 2005-183357 A | 7/2005 |
| JP | 2005-327597 A | 11/2005 |
| KR | 2005-0037608 A | 4/2005 |
| WO | 2004/051779 A1 | 6/2004 |
| WO | WO 2004/102720 A1 | 11/2004 |
| WO | WO 2005/043017 A1 | 5/2005 |
| WO | WO 2005/060036 A1 | 6/2005 |
| WO | WO 2005/112159 A1 | 11/2005 |

* cited by examiner

FUEL CELL SYSTEM AND MOBILE ARTICLE

This is a division of application number 12/085,167 filed 16 May 2008, which is a 371 national phase application of PCT/JP2006/324038 filed 24 Nov. 2006, which claims priority of Japanese Patent Applications No. 2005-358129 filed 12 Dec. 2005, and No. 2006-132985 filed 11 May 2006, the contents of which are incorporated herein by reference.

BACKGROUND

The present invention relates to a fuel cell system and a mobile article.

Fuel cell systems having a fuel cell for receiving reactant (fuel and oxidizing) gases to generate electricity have been proposed and are currently being put to practical use. Such fuel cell systems are provided with a fuel supply flow path to flow fuel gas supplied from a fuel supply source such as a hydrogen tank to the fuel cell.

Moreover, a pressure regulating valve (regulator) is generally provided in the fuel supply flow path to decrease the supply pressure to a constant value when the fuel gas supply pressure from the fuel supply source is extremely high. In recent years, a technique has been proposed (refer to Japanese Patent Application Laid-open No. 2004-139984, for example) for varying the supply pressure of the fuel gas in response to the operating state of the system by providing a mechanical variable pressure regulating valve (a variable regulator) for varying the supply pressure of the fuel gas in the fuel supply flow path between two levels, for example.

SUMMARY

With a mechanical variable regulating valve such as described in the patent above, however, not only does the construction make it difficult to quickly vary the fuel gas supply pressure (that is, the responsiveness is low), high precision regulation such as varying the target pressure among multiple levels is not possible.

Moreover, conventional mechanical variable pressure regulating valves are large and heavy because they have relatively complex constructions, and they are expensive to manufacture. Because conventional mechanical variable pressure regulating valves are simply for varying the fuel gas supply pressure, a separate shut-off valve is further required for shutting off the fuel gas supply. This leads to the problem of an increase in the size of the system (increased equipment space) and equipment expenses.

With the foregoing circumstances in view, it is an object of the present invention to provide a fuel cell system with a high responsiveness capable of suitably varying the fuel gas supply state (supply pressure and the like) in response to the operating state of the fuel cell.

In order to achieve the above-mentioned object, the fuel cell system according to the present invention comprises a fuel cell, a fuel cell supply system for supplying fuel gas to the fuel cell, an injector for regulating the gas state upstream in the fuel supply system and supplying the gas downstream, and control means to drive and control the injector at a predetermined drive cycle, wherein the control means sets the working state of the injector in response to the operating state of the fuel cell.

According to such a construction, the working state of the injector (the degree of opening of the injector valve body (gas passage area), the opening time of the injector valve (gas injection time), and the like) can be set according to the operating state of the fuel cell (the electricity generation quantity of the fuel cell (power, current, and voltage), the temperature of the fuel cell, an abnormal state of the fuel cell system, an abnormal state of the fuel cell main unit, and the like). Accordingly, the fuel gas supply pressure can be suitably varied in response to the operating state of the fuel cell, improving the responsiveness. The "gas state" means the state of gas expressed by flow rate, pressure, temperature, mol concentration, or the like, and in particular includes at least one of the gas flow rate and the gas pressure.

In the above-mentioned fuel cell system, the fuel supply system has a fuel supply flow path for flowing fuel gas supplied from the fuel supply source to the fuel cell, and the injector can be disposed in this fuel supply flow path.

Furthermore, in the above-mentioned fuel cell system, a regulator can be disposed between the fuel supply source and the injector.

If such a constitution is adopted, even if the fuel gas supply pressure from the fuel supply source is high, the supply pressure can be decreased by the regulator, so the pressure upstream of the injector can be decreased. Consequently, the difficulty in moving the injector valve body due to the increase in differential pressure of the pressures upstream and downstream of the injector can be alleviated. As a result, the drop in the responsiveness of the injector can be curbed.

In the above-mentioned fuel cell system, the fuel supply system can have a fuel supply flow path for supplying fuel gas supplied from the fuel supply source to the fuel cell, and a circulation flow path for returning fuel off-gas discharged from the fuel cell to the fuel supply flow path. In this case, the injector is preferably disposed upstream of the joining section of the fuel supply flow path and the circulation flow path.

If such a constitution is adopted, the impact of the joining pressure of the fuel gas flowing inside the fuel supply flow path and the fuel off-gas flowing inside the circulation flow path can be curbed. Furthermore, even if the gas flow inside the circulation flow path is obstructed due to freezing of residual moisture in the circulation flow path or the like, the fuel gas supply pressure can be regulated without being affected by the freezing.

Furthermore, in the above-mentioned fuel cell system, the control means preferably calculates the static flow rate upstream of the injector based on the gas state thereat and sets the working state of the injector in response to the static flow rate.

Injection discrepancies due to variance in the gas state upstream of the injector can thereby be curbed when supplying fuel gas.

Furthermore, in the above-mentioned fuel cell system, the control means can set the inactive injection time of the injector based on the gas state upstream of the injector.

Furthermore, in the above-mentioned fuel cell system, a pressure sensor can be disposed at a pressure regulation position, where pressure regulation is required in the fuel supply system. Additionally, the control means can calculate a pressure differential decrease correction flow rate for decreasing the deviation between the target pressure value at the pressure regulation position set based on the operating state of the fuel cell and a detection pressure value detected by the pressure sensor, and set the working state of the injector based on the above-mentioned pressure differential decrease correction flow rate. Additionally, the control means can calculate the fuel consumption quantity in the fuel cell based on the operating state thereof, and set the working state of the injector based on the fuel consumption quantity and the above-mentioned pressure differential decrease correction flow rate.

The working state of the injector (the injection flow rate, for example) can thereby be set such as to decrease the deviation between the target pressure value and the detection pressure value so that the detection pressure value approaches the target pressure value.

Additionally, in the above-mentioned fuel cell system, the control means can calculate a proportional-type pressure differential decrease correction flow rate by multiplying the proportional gain to the deviation between the target pressure value and the detection pressure value. Additionally, the control means can calculate an integrated-type pressure differential decrease correction flow rate by multiplying the integrated gain by the integrated value of the deviation between the target pressure value and the detection pressure value. In such a case, the control means can vary at least one of the proportional gain and the integrated gain based on the operating state of the fuel cell (for example, decreasing the proportional gain or integrated gain as the quantity of electricity generated by the fuel cell decreases).

This makes it possible to modify the calculation mode of the pressure differential decrease correction flow rate based on the operating state of the fuel cell to suitably control the injector, so the fuel gas can be stably supplied in a wide range of operating states.

When the proportional gain or integrated gain used in calculating the proportional-type or integrated-type pressure differential decrease correction flow rate is set to a constant value, the fuel gas supply pressure from the injector follows the target pressure value with a constant responsiveness even if the operating state of the fuel cell changes. However, if the proportional gain or the integrated gain similar to that during a high load is adopted in an operating state where the electricity generation quantity of the fuel cell is relatively low (during a low load), the fuel gas supplied from the injector is not adequately consumed by the fuel cell, so pulsation may occur in the fuel supply system, and the supply state of the fuel gas may thereby become unstable. By making at least one of the proportional gain and integrated gain, for example, lower during a low load than during a high load, the occurrence of pulsation can thereby be curbed. If a proportional gain or integrated gain similar to that during a low load is adopted during a high load, the fuel gas supplied from the injector is consumed by the fuel cell in a large quantity, and the supply quantity of the fuel gas may therefore be inadequate, decreasing the responsiveness to the target pressure value. By making at least one of the proportional gain and integrated gain, for example, higher during a high load than during a low load, the responsiveness to the target pressure value can be improved. As a result, the fuel gas can be stably supplied in a wide range of operating states (during a low load and a high load).

Additionally, in the above-mentioned fuel cell system, the control means can calculate and update the target pressure value at the pressure regulation position based on the operating state of the fuel cell at predetermined intervals. The pressure differential corresponding correction flow rate corresponding to the deviation between the previously calculated target pressure value and the currently calculated target pressure value can be calculated, as can the injection flow rate of the injector by adding that pressure differential corresponding correction flow rate, the above-mentioned fuel consumption quantity, and the above-mentioned pressure differential decrease correction flow rate.

The injection flow rate of the injector can thereby be quickly modified to correspond to fluctuation in the target pressure value and further improve the responsiveness. If the pressure differential corresponding correction flow rate is not taken into consideration, all of the deviations between the target pressure values and detection pressure values due to fluctuation in the target pressure value need to be compensated with the pressure differential decrease correction flow rate, which may cause an increase in the value of the pressure differential decrease correction flow rate and delay control of the injector, but if the pressure differential corresponding correction flow rate corresponding to the fluctuation component of the target pressure value is used, the increase in the value of the pressure differential decrease correction flow rate can be curbed, making quick control of the injector possible.

Additionally, in the above-mentioned fuel cell system, the control means can calculate the static flow rate upstream of the injector based on the gas state thereat, and calculate a basic injection time of the injector by multiplying the drive cycle by a value obtained by dividing the injection flow rate of the injector by the static flow rate. Furthermore, the control means can set the inactive injection time of the injector based on the gas state upstream of the injector, and can calculate the entire injection time thereof by adding the above-mentioned basic injection time and the above-mentioned inactive injection time.

Additionally, a mobile article according to the present invention comprises the above-mentioned fuel cell system.

According to such a constitution, a fuel cell system is provided, capable of suitably varying the fuel gas supply pressure in response to the operating state of the fuel cell, so a mobile article having a high responsiveness can be provided.

According to the present invention, a fuel cell system with a high responsiveness can be provided, capable of suitably varying the fuel gas supply state (supply pressure and the like) in response to the operating state of the fuel cell.

DETAILED DESCRIPTION

A fuel cell system 1 according to an embodiment of the present invention is described below with reference to the drawings. In the present embodiment, an example is described in which the present invention is applied to an on-board electricity generation system of a fuel cell vehicle S (mobile article).

Figure 1:
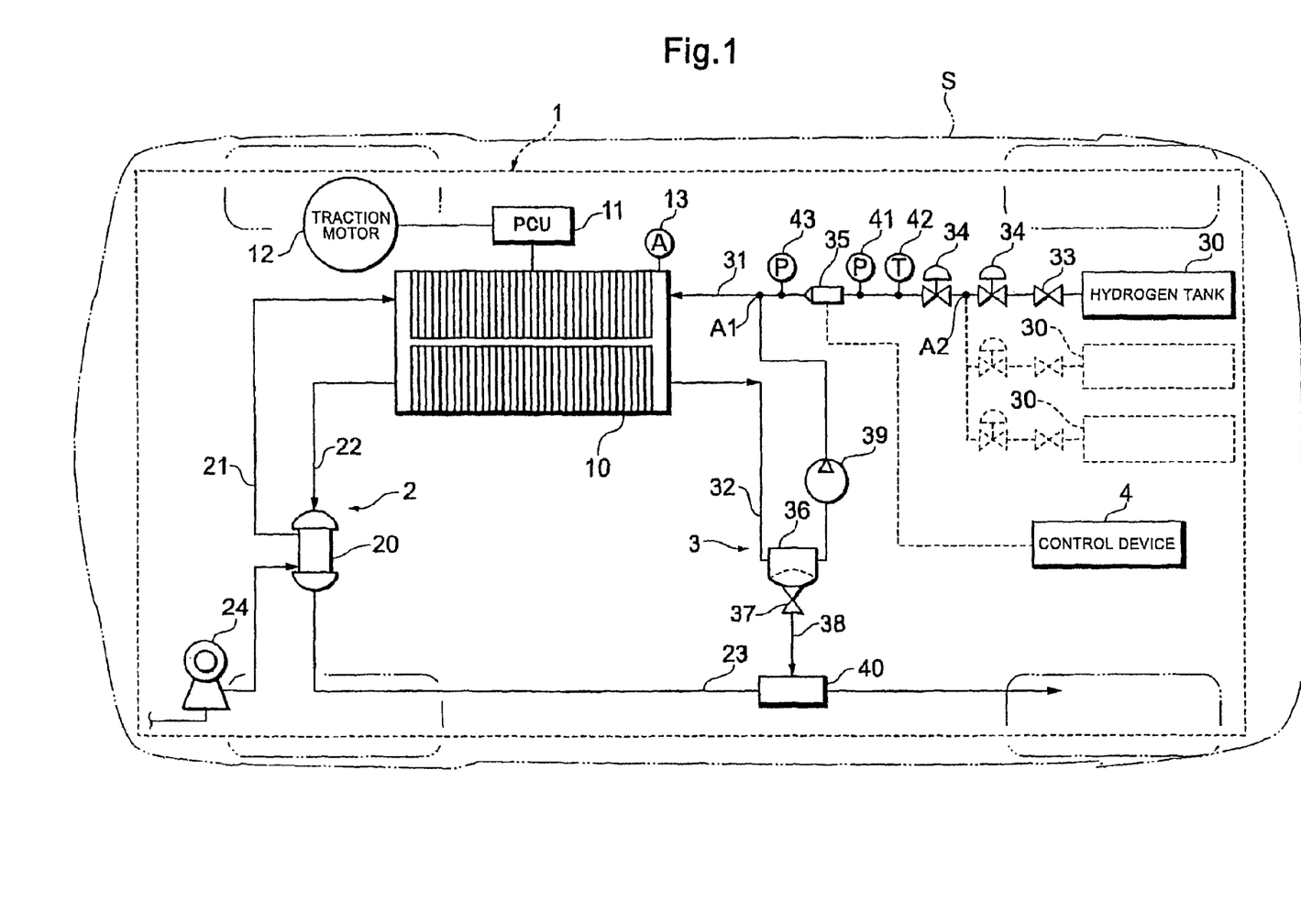
FIG. 1 is a constitution view of the fuel cell system according to the embodiment of the present invention.
Figure 2:
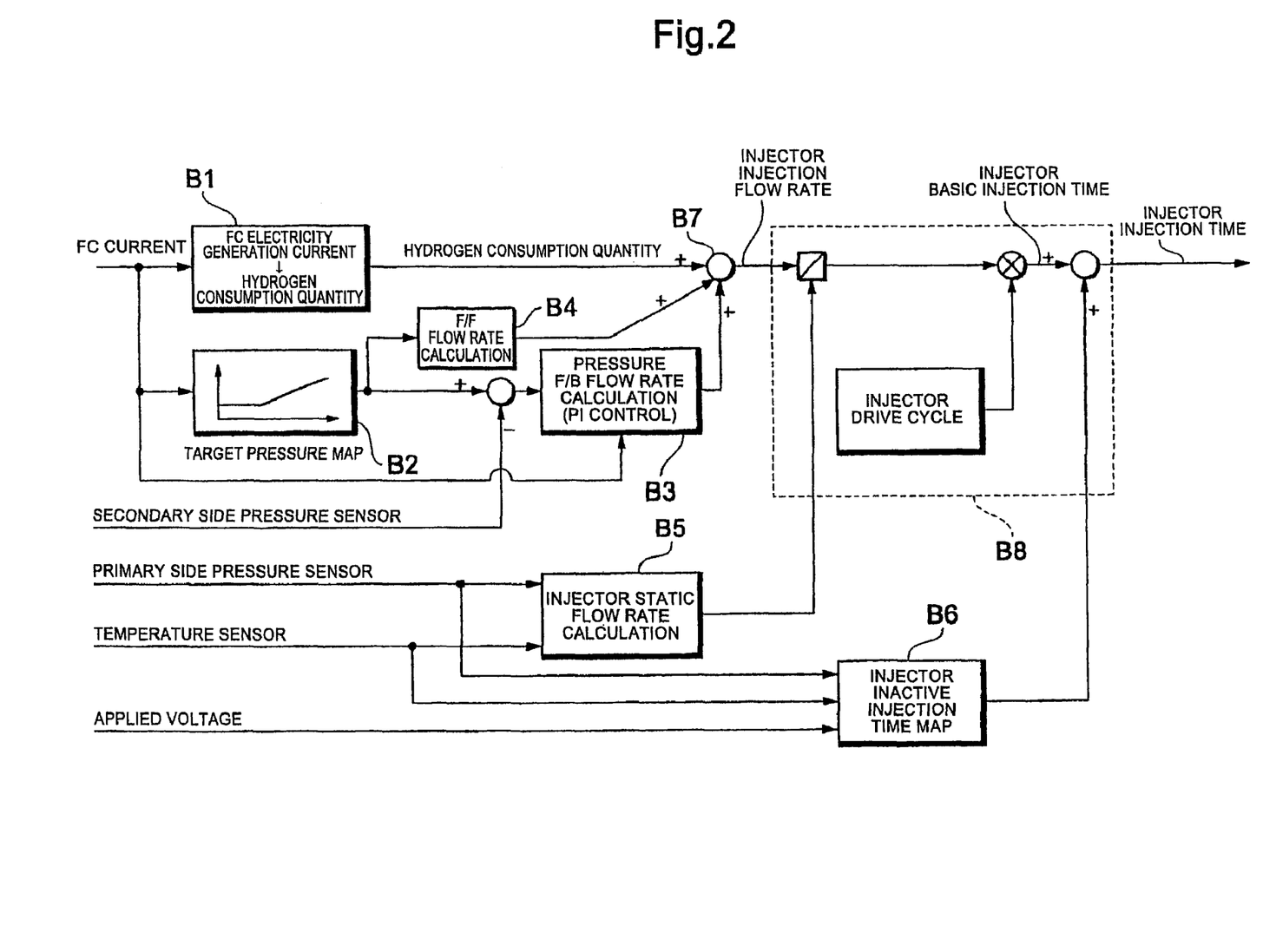
FIG. 2 is a control block diagram for explaining the control modes of the control device of the fuel cell system shown in FIG. 1.
Figure 3:
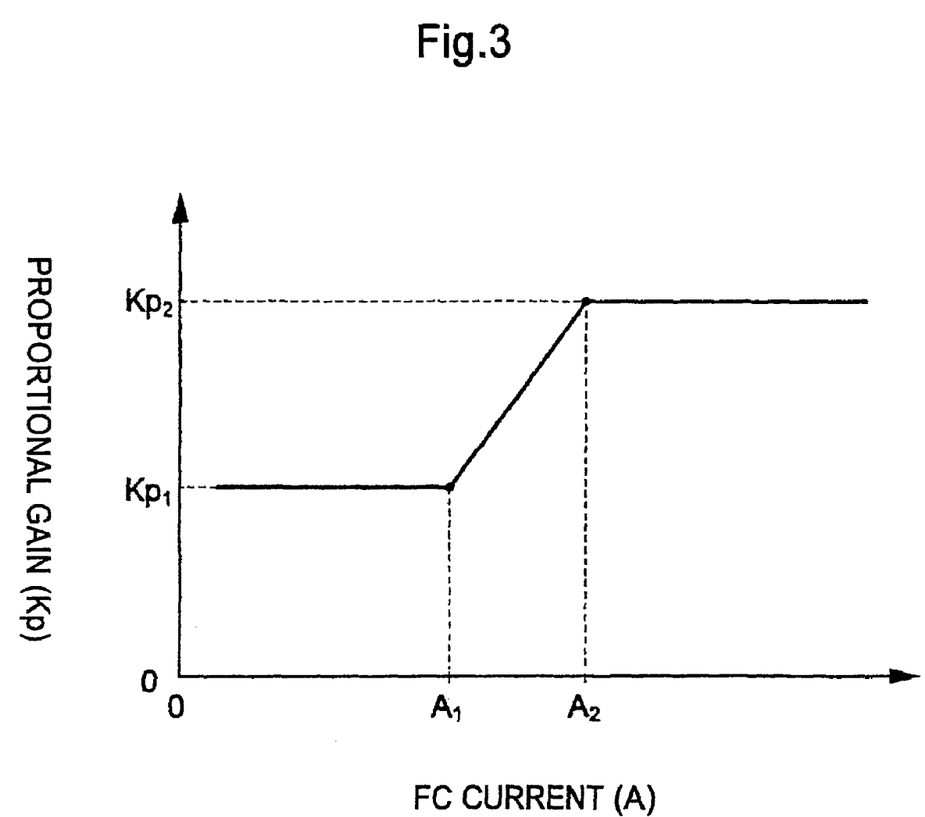
FIG. 3 is a map for representing the relationship of the electricity generation current of the fuel cell of the fuel cell system shown in FIG. 1 and the proportional gain used when calculating a feed back correction flow rate.

First, the constitution of the fuel cell system 1 according to the embodiment of the present invention is described using FIGS. 1 to 3.

The fuel cell system 1 according to the present embodiment comprises a fuel cell 10 for receiving a supply of reactant (oxidizing and fuel) gases and generating electric power, and the fuel cell 10 comprises an oxidizing gas pipe system 2 for supplying air as the oxidizing gas to the fuel cell 10, a hydrogen gas pipe system 3 for supplying hydrogen gas as the fuel gas to the fuel cell 10, and a control device 4 for controlling the overall system in an integrated manner as shown in FIG. 1.

The fuel cell 10 has a stack construction for receiving the supply of reactant gases made by layering a required number of single cells for generating electricity. The electric power generated by the fuel cell 10 is supplied to a power control unit (PCU) 11. The PCU 11 comprises an inverter, a DC-DC converter, and the like disposed between the fuel cell 10 and a traction motor 12. Additionally, a current sensor 13 for detecting current during electricity generation is mounted in the fuel cell 10.

The oxidizing gas pipe system 2 comprises an air supply flow path 21 for supplying oxidizing gas (air) humidified by a humidifier 20 to the fuel cell 10, an air discharge flow path 22 for guiding oxidation off-gas discharged from the fuel cell 10 to the humidifier 20, and an air exhaust flow path 23 for externally guiding the oxidation off-gas from the humidifier 21. The air supply flow path 21 is provided with a compressor 24 for taking oxidizing gas in the atmosphere and pressure feeding it to the humidifier 20.

The hydrogen gas pipe system 3 comprises a hydrogen tank 30 as the fuel supply source for storing high-pressure (such as 70 MPa) hydrogen gas, a hydrogen supply flow path 31 as a fuel supply flow path for supplying the hydrogen gas in the hydrogen tank 30 to the fuel cell 10, and a circulation flow path 32 for returning hydrogen off-gas discharged from the fuel cell 10 to the hydrogen supply flow path 31. The hydrogen gas pipe system 3 is one embodiment of the fuel supply system in the present invention. A reformer for generating hydrogen-rich reformed gas from fuel of a hydrocarbon system and a high-pressure gas tank for accumulating the reformed gas generated by the reformer in a high-pressure state may be adopted as the fuel supply source in place of the hydrogen tank 30. Additionally, a tank having a hydrogen occlusion alloy may be adopted as the fuel supply source.

The hydrogen supply flow path 31 is provided with a shut-off valve 33 for shutting off and allowing the supply of hydrogen gas from the hydrogen tank 30, a regulator 34 for regulating the pressure of the hydrogen gas, and an injector 35. Additionally, a primary side pressure sensor 41 and a temperature sensor 42 for detecting the pressure and temperature of the hydrogen gas inside the hydrogen supply flow path 31 are provided upstream of the injector 35. Additionally, a secondary side pressure sensor 43 for detecting the hydrogen gas pressure inside the hydrogen supply flow path 31 is provided upstream of the joining section of the hydrogen supply flow path 31 and the circulation flow path 32, downstream of the injector 35.

A regulator 34 is a device for regulating the upstream pressure (primary pressure) to a preset secondary pressure. In the present embodiment, a mechanical decompression valve for reducing the primary pressure is adopted as the regulator valve 34. A publicly known construction may be adopted for the mechanical decompression valve, having a housing formed with a back pressure chamber and a pressure regulation chamber separated by a diaphragm for reducing the primary pressure in the pressure regulation chamber by a predetermined pressure to the secondary pressure by means of the back pressure inside the back pressure chamber. In the present embodiment, the pressure upstream of the injector 35 can be effectively decreased by disposing two of the regulators 34 upstream of the injector 35 as shown in FIG. 1. The design of the mechanical construction (such as the valve body, the housing, the flow path, and the drive apparatus) of the injector 35 can be made less restrictive. Additionally, because the pressure upstream of the injector 35 can be reduced, it is possible to alleviate the difficulty of moving the valve body of the injector 35 due to an increase in the differential pressure of the pressures upstream and downstream of the injector 35. It is therefore possible to increase the variable regulation width of the pressure downstream of the injector 35 and curb the decrease in responsiveness of the injector 35.

The injector 35 is an electromagnetically driven on-off valve capable of regulating gas flow rate and gas pressure by directly driving the valve body with an electromagnetic drive force at predetermined drive cycles and isolating the valve body from the valve seating. The injector 35 comprises a valve seating having an injection hole for injecting hydrogen gas and other gas fuels as well as comprising a nozzle body for guiding and supplying the gas fuel to the injection hole and a valve body housed and maintained movable in the axial direction (the gas flow direction) of the nozzle body for opening and closing the injection hole. The valve body of the injector 35 is driven by a solenoid, for example, and can switch the surface area of the opening of the injection hole between two or more levels by means of turning on and off a pulse-type exciting current supplied to the solenoid. By controlling the gas injection time and timing of the injector 35 with a control signal outputted from the control device 4, the flow rate and pressure of the hydrogen gas can be controlled with high precision. The injector 35 directly drives the valve (valve body and seating) to open and close with an electromagnetic driving force and has a high responsiveness because its drive cycle can be controlled up to a region of high responsiveness.

In the present embodiment, the injector 35 is disposed upstream of a joining section A1 of the hydrogen supply flow path 31 and the circulation flow path 32 as shown in FIG. 1. If a plurality of hydrogen tanks 30 are adopted as the fuel supply source as shown with the dashed lines in FIG. 1, the injector 35 is disposed downstream of the section where the hydrogen gas supplied from the hydrogen tanks 30 joins (a hydrogen gas joining section A2).

A discharge flow path 38 is connected to the circulation flow path 32 through a gas-liquid separator 36 and a water/air exhaust valve 37. The gas-liquid separator 36 collects moisture from the hydrogen off-gas. The water/air exhaust valve 37 operates in response to a command from the control device 4 to externally exhaust (purge) the moisture collected by the gas-liquid separator 36 and the hydrogen off-gas comprising impurities in the circulation flow path 32. Additionally, a hydrogen pump 39 for pressurizing the hydrogen gas inside the circulation flow path 32 and feeding same to the hydrogen supply flow path 31 side is provided in the circulation flow path 32. The hydrogen off-gas exhausted through the air/water exhaust valve 37 and the discharge flow path 38 is diluted by a diluter 40 and joins the oxidation off-gas inside the air exhaust flow path 23.

The control device 4 detects the amount of operation of an acceleration operation member (an accelerator or the like) provided in the fuel cell vehicle S, receives control information such as the acceleration request value (the electricity generation quantity requested from a load device such as the traction motor 12, for example), and controls the operation of each apparatus in the system. The load device refers collectively to power consuming devices including auxiliary devices required to operate the fuel cell 10 (such as the compressor 24, the hydrogen pump 39, and a motor for a cooling pump, for example), actuators used in devices involved in running the fuel cell vehicle S (such as a transmission, a wheel control device, a steering device, and a suspension device), an air conditioner (A/C) for the passenger space, illumination, audio devices, and the like in addition to the traction motor 12.

The control device 4 is constructed from a computer system not illustrated. The computer system comprises a CPU, a ROM, a RAM, a hard disk drive, an I/O interface, and a display, and can implement various control operations when the CPU reads and executes control programs written in the ROM.

In further detail, the control device 4 calculates the quantity of hydrogen gas consumed by the fuel cell 10 (hereinafter, referred to as the "hydrogen consumption quantity") based on the operating state of the fuel cell 10 (the current value detected by the current sensor 13 when the fuel cell 10 is generating electricity) as shown in FIG. 2 (fuel consumption quantity calculation function: B1). In the present embodiment, a specific calculation formula for expressing the relationship of the current value of the fuel cell 10 and the hydrogen consumption quantity is used to calculate and update the hydrogen consumption quantity every calculation cycle of the control device 4.

Additionally, the control device 4 calculates a target pressure value of the hydrogen gas (the target gas supply pressure to the fuel cell 10) at a position downstream of the injector 35 based on the operating state of the fuel cell 10 (the current value detected by the current sensor 13 when the fuel cell 10 is generating electricity) (target pressure value calculation function: B2). In the present embodiment, a specific map for expressing the relationship of the current value and the target pressure value of the fuel cell 10 is used to calculate and update the target pressure value at the position (the pressure regulation position where pressure regulation is requested) where the secondary side pressure sensor 43 is disposed every calculation cycle of the control device 4.

Additionally, the control device 4 calculates a feed back correction flow rate based on the deviation between the calculated target pressure value and the pressure value (detection pressure value) at the position downstream (pressure regulation position) of the injector 35 detected by the secondary side pressure sensor 43 (feed back correction flow rate calculation function: B3). The feed back correction flow rate is the hydrogen gas flow rate (pressure differential decrease correction flow rate) added to the hydrogen consumption quantity in order to decrease the deviation between the target pressure value and the detection pressure value.

In the present embodiment, a PI-type feed back control rule is used to calculate and update the feed back correction flow rate each calculation cycle of the control device 4. In further detail, the control device 4 calculates the proportional-type feed back correction flow rate (proportion term $P=K_p \times e$) by multiplying the proportional gain ($K_p$) by the deviation ($e$) between the target pressure value and the detected pressure value, calculates the integral-type feed back correction flow rate (integral term $I=K_I \times \int(e)dt$) by multiplying the integrated gain ($K_I$) by the time integral value of the deviation ($\int(e)dt$), and calculates the feed back correction flow rate including these values added in.

Additionally, the control device 4 modifies the value of the proportional gain ($K_p$) used in calculating the proportional-type feed back correction flow rate according to the operating state of the fuel cell 10. The control device 4 in the present embodiment sets the proportional gain to a lower limit value ($K_{p1}$) when the electricity generation current value of the fuel cell 10 is less than a first threshold value ($A_1$) and sets the proportional gain to an upper limit value ($K_{p2}$) when the electricity generation current value of the fuel cell 10 exceeds a second threshold value ($A_2$) ($A_2>A_1$) as shown in the map of FIG. 3. The control device 4 linearly varies the proportional gain from the lower limit value ($K_{p1}$) to the upper limit value ($K_{p2}$) in proportion to the electricity generation current value such as to increase monotonically when the electricity generation current value of the fuel cell 10 is between the first threshold value ($A_1$) and the second threshold value ($A_2$). That is, if the electricity generation current value of the fuel cell 10 is between the first and second threshold values, the value of the proportional gain decreases as the electricity generation current value decreases, and if the electricity generation current value is below the first threshold value, the proportional gain is set to a fixed (lower limit) value. Also, if the electricity generation current value of the fuel cell 10 is between the first and second threshold values, the value of the proportional gain increases as the electricity generation current value increases, and if the electricity generation current value exceeds the second threshold value, the proportional gain is set to a fixed (upper limit) value. The first and second threshold values as well as the upper and lower limit values may be suitably set according to the specifications and the like of the fuel cell 10.

When the proportional gain ($K_p$) is set to a fixed value, the supply pressure value of the hydrogen gas from the injector 35 attempts to follow the target pressure value with a fixed responsiveness even when the operating state of the fuel cell 10 changes. If a proportional gain ($K_p$) similar to that during a high load is adopted in an operating state where the electricity generation quantity of the fuel cell 10 is relatively low (during a low load), the hydrogen gas supplied from the injector 35 is not adequately consumed by the fuel cell 10, so pulsation may occur in the hydrogen supply flow path 31 and the circulation flow path 32, causing instability in the hydrogen gas supply state. Occurrence of this pulsation may be curbed by making the proportional gain ($K_{p1}$) during a low load (when the current value is less than the first threshold value) smaller than the proportional gain ($K_{p2}$) during a high load (when the current value exceeds the second threshold value) as in the present embodiment. If a proportional gain ($K_p$) similar to that during a low load is adopted during a high load, the hydrogen gas supplied from the injector 35 is consumed by the fuel cell 10 in a large quantity, so the supply quantity of the hydrogen gas may be inadequate, decreasing the responsiveness to the target pressure value. The proportional gain ($K_{p2}$) during a high load may therefore be made larger than the proportional gain ($K_{p1}$) during a low load as in the present embodiment, thereby improving the responsiveness to the target pressure value. As a result, hydrogen gas can be stably supplied in a wide range of operating states (during a low load and a high load).

Furthermore, the control device 4 calculates the feed forward correction flow rate corresponding to the deviation between the previously calculated target pressure value and the currently calculated target pressure (feed forward correction flow rate calculation function: B4). The feed forward correction flow rate is the amount of fluctuation (pressure difference corresponding correction flow rate) in the hydrogen gas flow rate due to fluctuation in the target pressure value. In the present embodiment, a specific calculation formula for representing the relationship between the target pressure value deviation and the feed forward correction flow rate is used to calculate and update the feed forward correction flow rate every calculation cycle of the control device 4.

Furthermore, the control device 4 calculates the static flow rate upstream of the injector 35 based on the gas state (the pressure of the hydrogen gas detected by the primary side pressure sensor 41 and the temperature of the hydrogen gas detected by the temperature sensor 42) upstream of the injector 35 (static flow rate calculation function: B5). In the present embodiment, a specific calculation formula for representing the relationship between the pressure and temperature and the static flow rate of the hydrogen gas upstream of the injector 35 is used to calculate and update the static flow rate every calculation cycle of the control device 4.

Furthermore, the control device 4 calculates the inactive injection time of the injector 35 based on the gas state (the hydrogen gas pressure and temperature) and applied voltage upstream of the injector 35 (inactive injection time calculation function: B6). Here, the inactive injection time means the time required from when the injector 35 receives a control signal from the control device 4 until it actually starts injection. In the present embodiment, a specific map for representing the relationship of the pressure and temperature of the hydrogen gas upstream of the injector 35 as well as the applied voltage and inactive injection time is used to calculate and update the inactive injection time every calculation cycle of the control device 4.

Furthermore, the control device 4 calculates the injection flow rate of the injector 35 by adding the hydrogen consumption quantity, the feed back correction flow rate, and the feed forward correction flow rate (injection flow rate calculation function: B7). Furthermore, the control device 4 calculates the total injection time of the injector 35 by dividing the injection flow rate of the injector 35 by the static flow rate and multiplying by the drive cycle of the injector 35 to calculate the basic injection time of the injector 35, then adding the basic injection time to the inactive injection time (total injection time calculation function: B8). Here, the drive cycle means the cycle of the step-shaped (on/off) waveform for representing the open and closed states of the injection hole of the injector 35. In the present embodiment, the drive cycle is set to a fixed value by the control device 4.

The control device 4 then outputs a control signal for implementing the total injection time of the injector 35 calculated through the procedure described above, thereby controlling the gas injection time and gas injection timing of the injector 35 and regulating the flow rate and pressure of the hydrogen gas supplied to the fuel cell 10.

Figure 4:
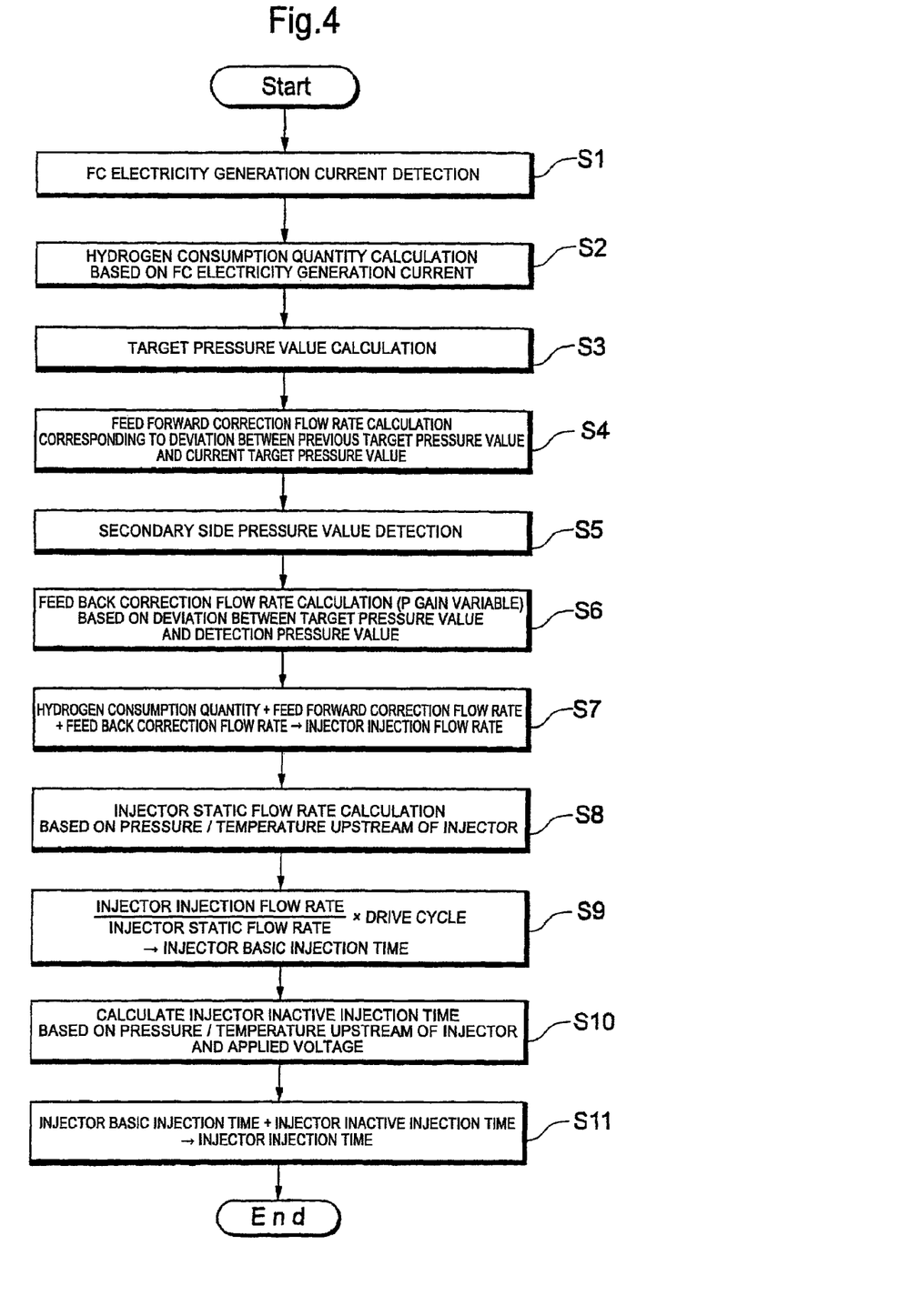
FIG. 4 is a flowchart for explaining the operation of the fuel cell system shown in FIG. 1.

Next, the operation of the fuel cell system 1 according to the present embodiment is described using the flowchart of FIG. 4.

During normal operation of the fuel cell system 1, hydrogen gas from the hydrogen tank 30 is supplied to a fuel electrode of the fuel cell 10 through the hydrogen supply flow path 31, and humidity-regulated air is supplied to an oxidizing electrode of the fuel cell 10 through the air supply flow path 21, thereby generating electricity. The electricity drawn from the fuel cell 10 (the required power) is calculated by the control device 4, and the quantity of oxygen gas and air corresponding to that quantity of electricity generation are supplied into the fuel cell 10. In the present embodiment, the pressure of the hydrogen gas supplied to the fuel cell 10 is controlled to high precision during such normal operation.

That is, first, the control device 4 of the fuel cell system 1 detects the current value during electricity generation of the fuel cell 10 using the current sensor 13 (current detection step: S1). Next, the control device 4 calculates the quantity of hydrogen gas consumed by the fuel cell 10 (the hydrogen consumption quantity) based on the current value detected by the current sensor 13 (fuel consumption quantity calculation step: S2).

Next, the control device 4 calculates the target pressure value of the hydrogen gas at the position downstream (the pressure regulation position) of the injector 35 based on the current value detected by the current sensor 13 (target pressure value calculation step: S3). Then, the control device 4 calculates the feed forward correction flow rate corresponding to the deviation between the previously calculated target pressure value and the currently calculated target pressure value (feed forward correction flow rate calculation step: S4).

Next, the control device 4 detects the pressure value of the position downstream (the pressure regulation position) of the injector 35 using the secondary side pressure sensor 43 (pressure value detection step: S5). Then, the control device 4 calculates the feed back correction flow rate based on the deviation between the target pressure value calculated in target pressure calculation step S3 and the pressure value (detection pressure value) detected in pressure value detection step S5 (feed back correction flow rate calculation step: S6). In feed back correction flow rate calculation step S6, the control device 4 uses the map of FIG. 3 to vary the proportional gain ($K_p$) value in order to calculate the proportional-type feed back correction flow rate according to the electricity generation current value of the fuel cell 10 detected in current detection step S1.

Next, the control device 4 calculates the injection flow rate of the injector 35 by adding the hydrogen consumption quantity calculated in fuel consumption flow rate calculation step S2, the feed forward correction flow rate calculated in feed forward correction flow rate calculation step S4, and the feed back correction flow rate calculated in feed back correction flow rate calculation step S6 (injection flow rate calculation step: S7).

Next, the control device 4 calculates the static flow rate upstream of the injector 35 based on the hydrogen gas pressure upstream of the injector 35 detected by the primary side pressure sensor 41 and the hydrogen gas temperature upstream of the injector 35 detected by the temperature sensor 42 (static flow rate calculation step: S8). The control device 4 then calculates the basic injection time of the injector 35 by dividing the injection flow rate of the injector 35 calculated in injection flow rate calculation step S7 by the static flow rate calculated in static flow rate calculation step S8 and multiplying by the drive cycle of the indictor 35 (basic injection time calculation step: S9).

Next, the control device 4 calculates the inactive injection time of the injector 35 based on the hydrogen gas pressure upstream of the injector 35 detected by the primary side pressure sensor 41, the hydrogen gas temperature upstream of the injector 35 detected by the temperature sensor 42, and the applied voltage (inactive injection time calculation step: S10). The control device 4 then calculates the total injection time of the injector 35 by adding the basic injection time of the injector 35 calculated in basic injection time calculation step S9 and the inactive injection time calculated in inactive injection time calculation step S10 (total injection time calculation step: S11).

The control device 4 then controls the gas injection time and gas injection timing of the injector 35 by outputting a control signal relating to the total injection time of the injector 35 calculated in total injection time calculation step S11, regulating the flow rate and pressure of the hydrogen gas supplied to the fuel cell 10.

The working state (injection time) of the injector 35 can be set in response to the operating state (current value during electricity generation) of the fuel cell 10 in the fuel cell system 1 according to the embodiment described above. Accordingly, the hydrogen gas supply pressure can be suitably varied in response to the operating state of the fuel cell 10, improving the responsiveness. Also, high precision pressure regulation (regulation of the hydrogen gas supply pressure to the fuel cell 10) is possible because the injector 35 is adopted as the flow rate regulating valve and variable pressure regulating valve for the hydrogen gas. In further detail, because the injector 35 is able to regulate the injection time and injection timing of the hydrogen gas after receiving a control signal from the control device 4 in response to the operating state of the fuel cell 10, the pressure can be regulated more rapidly and accurately than with a conventional mechanical variable pressure regulating valve. Furthermore, because the injector 35 is smaller and lighter as well as less expensive than a conventional mechanical variable pressure regulating valve, the overall system can be made smaller and less expensive.

Furthermore, because the regulator 34 is disposed between the hydrogen tank 30 and the injector 35 in the fuel cell system 1 according to the embodiment described above, the pressure of the hydrogen gas supplied from the hydrogen supply source 30 can be decreased by the regulator 34 even when high. Accordingly, because the pressure upstream of the injector 35 can be reduced, it is possible to alleviate the difficulty of moving the valve body of the injector 35 due to an increase in the differential pressure of the pressures upstream and downstream of the injector 35. The drop in the responsiveness of the injector 35 can therefore be curbed.

Furthermore, because the injector 35 is disposed upstream of the joining section A1 of the hydrogen supply flow path 31 and the circulation flow path 32 in the fuel cell system 1 according to the embodiment described above, the impact of the joining pressure of the hydrogen gas flowing inside the hydrogen supply flow path 31 and the hydrogen off-gas flowing inside the circulation flow path 32 can be curbed. Furthermore, even in the case where the gas flow inside the circulation flow path 32 is impeded due to freezing of residual moisture in the circulation flow path 32 or the like, the hydrogen gas supply pressure can be regulated without being affected by the freezing.

Furthermore, because the control device 4 calculates the static flow rate and the inactive injection time based on the gas state (pressure and temperature) upstream of the injector 35 and sets the working state (injection time) of the injector 35 with reference to said static flow rate and inactive injection time in the fuel cell system 1 according to the embodiment described above, it is possible to curb injection discrepancies based on variance in the gas state upstream of the injector 35 during hydrogen gas supply.

Furthermore, because the control device 4 calculates the feed back correction flow rate to decrease the deviation between the target pressure value at the pressure regulation position set based on the operating state (current value during electricity generation) of the fuel cell 10 and the detection pressure value detected by the secondary side pressure sensor 43, and sets the working state (injection time) of the injector 35 based on the feed back correction flow rate in the fuel cell system 1 according to the embodiment described above, the detection pressure value approaches the target pressure value.

Furthermore, because the control device 4 can modify the proportional gain ($K_p$) used in calculating the feed back correction flow rate based on the electricity generation current value of the fuel cell 10 in the fuel cell system 1 according to the embodiment described above, the injector 35 can be suitably controlled in response to the operating state of the fuel cell 10. The hydrogen gas can therefore be stably supplied in a wide range of operating states.

Furthermore, because the control device 4 calculates and updates the target pressure value every predetermined interval based on the operating state of the fuel cell 10, calculates the feed forward correction flow rate corresponding to the deviation between the previously calculated target pressure value and the currently calculated target pressure value, and sets the working state (injection time) of the injector 35 based on the feed forward correction flow rate, the working state of the injector 35 can be quickly varied in response to fluctuation in the target pressure value, further increasing the responsiveness. If the feed forward correction flow rate is not adopted, it is necessary to compensate for all the deviations between the target pressure values and the detection pressure values due to fluctuation in the target pressure value with the feed back correction flow rate, and therefore there is the risk of the feed back correction flow rate value increasing, and consequently control of the injector 35 may lag (the responsiveness may drop). In contrast, if a feed forward correction flow rate corresponding to the amount of fluctuation in the target pressure value is used as in the present embodiment, the increase in the feed back correction flow rate value can be curbed, and control of the indictor 35 made faster.

Furthermore, because the fuel cell vehicle S (mobile article) according to the embodiment described above is provided with a fuel cell system 1 capable of suitably varying the hydrogen gas supply pressure in response to the operating condition of the fuel cell 10, power can be outputted with high responsiveness for supplying to the traction motor 12 when there is a large acceleration demand in a short time period or when there is repeated acceleration and deceleration. Furthermore, the pressure regulation width can be varied with precision with respect to the value of the required power, curbing wasteful hydrogen consumption and hydrogen circulation, and decreasing fuel consumption. Furthermore, because the fuel cell vehicle S according to the present embodiment is provided with the fuel cell system 1 in which the injector 35 is adopted as the flow rate regulating valve and variable pressure regulating valve, it can be made compact and inexpensive.

Figure 5:
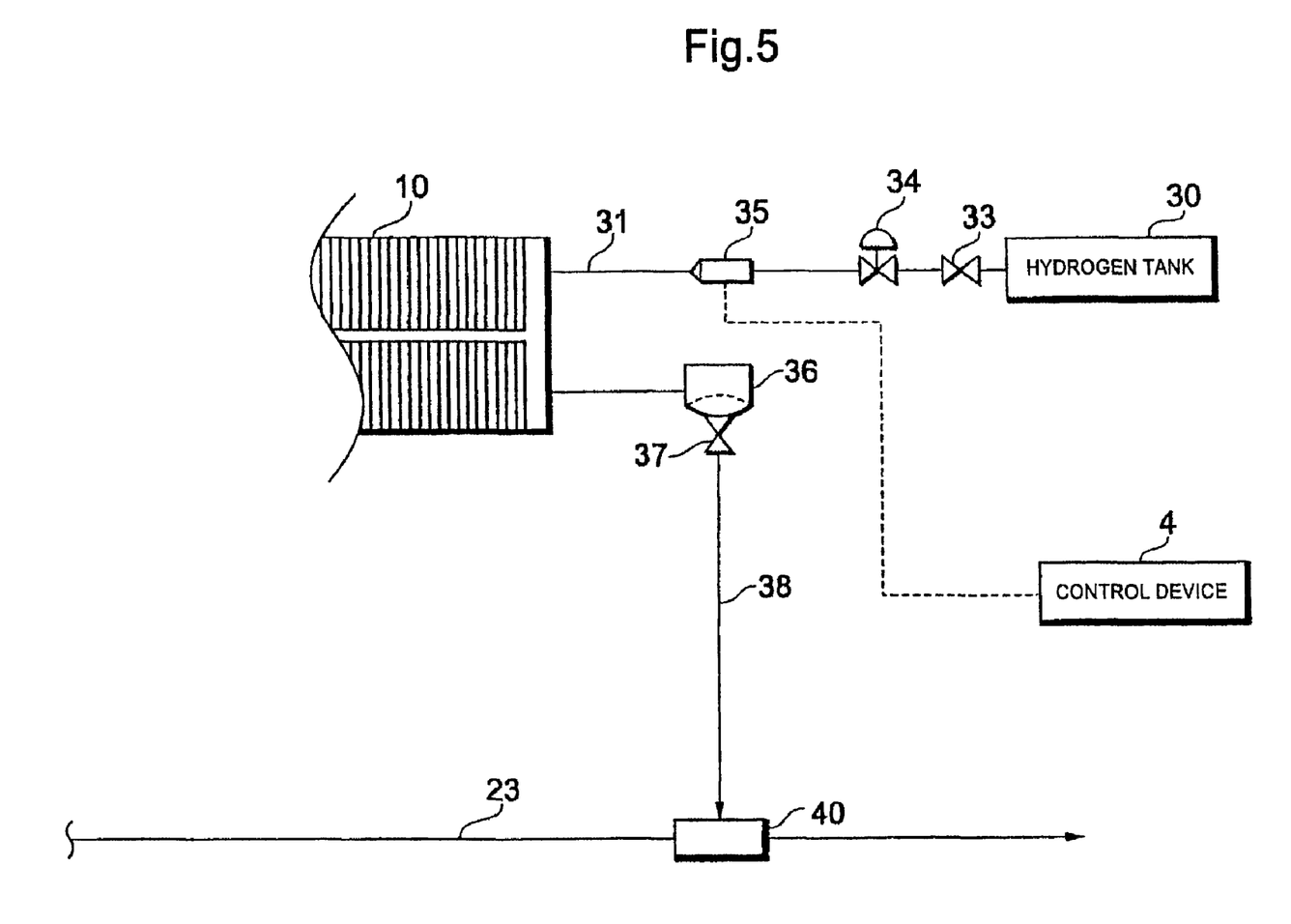
FIG. 5 is a construction view showing an alternative embodiment of the fuel cell system shown in FIG. 1.

In the embodiment described above, an example was indicated in which the circulation flow path 32 is provided in the hydrogen gas pipe system 3 of the fuel cell system 1, but the discharge flow path 38 can be directly connected to the fuel cell 10 as shown in FIG. 5, for example, to eliminate the circulation flow path 32. In the case where this (dead ending) constitution is adopted as well, operating effects similar to the embodiment described above can be obtained by controlling the working state of the injector 35 with the control device 4 similarly to as in the embodiment.

Furthermore, in the embodiment described above, an example was indicated in which the hydrogen pump 39 was provided in the circulation flow path 32, but an ejector may be adopted in place of the hydrogen pump 39. Furthermore, in the embodiment described above, an example was indicated in which the air/water exhaust valve 37 for draining both air and water was provided in the circulation flow path 32, but a water drainage valve for externally draining water collected by the gas-liquid separator 36 and an air exhaust valve for externally exhausting gas inside the circulation flow path 32 may be provided separately, with the exhaust air valve controlled by the control device 4.

Furthermore, in the embodiment described above, an example was indicated in which the secondary side pressure sensor 43 is disposed at a position downstream (the pressure regulation position: the position where pressure regulation is required) of the injector 35 of the hydrogen supply flow path 31 of the hydrogen gas pipe system 3, and the working state (injection time) of the injector 35 was set such as to regulate the pressure (draw it closer to the predetermined target pressure value) at that position, but the position at which the secondary side pressure sensor 43 is disposed is not limited thereto.

For example, a position near the hydrogen gas inlet (on the hydrogen supply flow path 31) of the fuel cell 10, a position near the hydrogen gas outlet (on the circulation flow path 32)

of the fuel cell 10, and a position near the outlet of the hydrogen pump 39 (on the circulation flow path 32) may be set as the pressure regulation positions, and secondary side pressure sensors disposed thereat. In such a case, a map is prepared in which the target pressure value is recorded for each pressure regulation position where a secondary pressure sensor is disposed, and the feed back correction flow rate is calculated based on the target pressure value recorded in the map and the pressure value detected by the secondary side pressure sensor (the detection pressure value).

Furthermore, in the embodiment described above, an example is indicated in which the shut-off valve 33 and the regulator 34 are provided in the hydrogen supply flow path 31, but the shut-off valve 33 and the regulator 34 do not necessarily need to be provided as the injector 35 can function as a variable pressure regulating valve and function as a shut-off valve for shutting off the supply of hydrogen gas. Because the cut-off valve 33 and the regulator 34 can be eliminated if the injector 35 is adopted, the system can therefore be made further compact and inexpensive.

Furthermore, in the embodiment described above, an example is indicated in which the current value is detected during electricity generation of the fuel cell 10, and the target pressure value and the hydrogen gas consumption quantity are calculated based on the current value to set the working state (injection time) of the injector 35, but another physical quantity indicating the operating state of the fuel cell 10 (such as the voltage value or power value during electricity generation of the fuel cell 10 or the temperature of the fuel cell 10) may be detected, and the working state of the injector 35 may be set according to that detected physical quantity. Furthermore, the mode of the operating state of the fuel cell 10 (such as a startup state, an intermittent operating state, a normal operating state, a purging state, an abnormal state of the fuel cell itself, or an abnormal state of the fuel cell system) may be determined by the control device, and the working state (such as the degree of opening of the valve body of the injector 35 (the gas passage area), and the opening time of the valve body of the injector 35 (the gas injection time)) of the injector 35 may be set in response to the mode of those operating states.

Furthermore, in the embodiment described above, an example is indicated in which only the proportional gain ($K_p$) used in calculating the proportional-type feed back correction flow rate is varied in response to the operating state of the fuel cell 10 (the current value during electricity generation), but the integrated gain ($K_I$) used in calculating the integrated-type feed back correction flow rate may be varied instead in response to the operating state of the fuel cell 10. When doing so, the integrated gain ($K_I$) may be set smaller as the electricity generation current value of the fuel cell 10 decreases (the integrated gain ($K_I$) may be set larger as the electricity generation current value of the fuel cell 10 increases), for example. The injector 35 can thus be controlled suitably in a wide range of operating states of the fuel cell 10 to stably supply hydrogen gas. Furthermore, both the proportion gain ($K_p$) and the integrated gain ($K_I$) may be varied in response to the operating state of the fuel cell 10.

Furthermore, in the embodiment described above, an example was indicated in which the proportional gain was set in response to the current value during electricity generation of the fuel cell 10, but the proportional gain ($K_p$) and the integrated gain ($K_I$) may be set instead based on the power value and the voltage value during electricity generation of the fuel cell 10. When doing so, a map for representing the relationship between the power value (voltage value) of the fuel cell 10 and the proportional gain ($K_p$) and integrated gain ($K_I$) may be used to set the proportional gain ($K_p$) and the integrated gain ($K_I$).

In the embodiment described above, an example was indicated in which the map of FIG. 3 for indicating the relationship between the electricity generation current value of the fuel cell 10 and the proportional gain was used to set the proportional gain, but the relationship of the electricity generation current value and the proportional gain is not limited to a mode such as indicated in the map of FIG. 3. Furthermore, in the embodiment described above, an example was indicated in which a PI-type feed back control rule was used to calculate the feed back correction flow rate, but another target tracking-type control (a PID-type feed back control, for example) may be used instead to calculate the feed back correction flow rate.

The fuel cell system according to the present invention can be mounted in a fuel cell vehicle as indicated in the embodiment described above and may be mounted in mobile articles other than a fuel cell vehicle (such as a robot, vessel, or aircraft) as well. Furthermore, the fuel cell system according to the present invention may also be applied to stationary electricity generation systems used as electricity generation equipment for structures (such as houses and buildings).

What is claimed is:

1. A control method for a fuel cell system including a fuel cell, a fuel supply system for supplying fuel gas to the fuel cell, a pressure sensor located at a pressure regulation position, and an injector for regulating a gas state upstream of the fuel supply system and for supplying the gas downstream, the method comprising the steps of:
    calculating a target pressure value at the pressure regulation position based on an operating state of the fuel cell;
    detecting, via the pressure sensor, a detection pressure value at the pressure regulation position;
    calculating a pressure differential decrease correction flow rate for decreasing a deviance of the target pressure value and the detection pressure value;
    setting an injection time of the injector based on the pressure differential decrease correction flow rate; and
    controlling the injector at a predetermined drive cycle based on the set injection time.

2. The method according to claim 1, wherein the fuel supply system has a fuel supply flow path for supplying fuel gas supplied from a fuel supply source to the fuel cell, and wherein the injector is disposed in the fuel supply flow path.

3. The method according to claim 2, wherein the fuel supply system has a regulator disposed between the fuel supply source and the injector.

4. The method according to claim 1,
    wherein the fuel supply system has a fuel supply flow path for supplying fuel gas supplied from the fuel supply source to the fuel cell, and a circulation flow path for returning fuel off-gas discharged from the fuel cell to the fuel supply flow path, and
    wherein the injector is disposed upstream of a joining section of the fuel supply flow path and the circulation flow path.

5. The method according to claim 1, further comprising:
    calculating a static flow rate upstream of the injector based on the gas state upstream thereof; and
    setting a working state of the injector in response to the static flow rate.

6. The method according to claim 1, further comprising setting an inactive injection time of the injector based on the gas state upstream of the injector.

7. The method according to claim 1, further comprising:
calculating a fuel consumption quantity in the fuel cell based on the operating state of the fuel cell; and
setting a working state of the injector based on the fuel consumption quantity and the pressure differential decrease correction flow rate.

8. The method according to claim 7, further comprising:
calculating and updating a target pressure value at the pressure regulation position every predetermined time period based on the operating state of the fuel cell;
calculating a pressure differential corresponding correction flow rate corresponding to a deviation between a previously calculated target pressure value and a currently calculated target pressure value; and
calculating an injection flow rate of the injector by adding the pressure differential corresponding correction flow rate, the fuel consumption quantity, and the pressure differential decrease correction flow rate.

9. The method according to claim 8, further comprising:
calculating a static flow rate upstream of the injector based on the gas state upstream thereof; and
calculating a basic injection time of the injector by multiplying the drive cycle by a value obtained by dividing the injection flow rate of the injector by the static flow rate.

10. The method according to claim 9, further comprising:
setting an inactive injection time of the injector based on the gas state upstream of the injector; and
calculating a total injection time of the injector by adding the basic injection time and the inactive injection time.

11. The method according to claim 1, further comprising:
calculating a proportional-type pressure differential decrease correction flow rate by multiplying a proportional gain by a deviance of the target pressure value and the detection pressure value; and
varying the value of the proportional gain based on the operating state of the fuel cell.

12. The method according to claim 1, further comprising:
calculating an integrated-type pressure differential decrease correction flow rate by multiplying an integrated gain by a deviance of the target pressure value and the detection pressure value; and
varying the value of the integrated gain based on the operating state of the fuel cell.

13. The method according to claim 1, further comprising:
calculating a proportional-type pressure differential decrease correction flow rate by multiplying a proportional gain by a deviance of the target pressure value and the detection pressure value;
calculating an integrated-type pressure differential decrease correction flow rate by multiplying an integrated gain by an integrated value of the deviance; and
varying at least one of the proportional gain and the integrated gain based on the operating state of the fuel cell.

14. The method according to claim 13, further comprising decreasing at least one of the proportional gain and the integrated gain as the quantity of electricity generated by the fuel cell decreases.

* * * * *

UNITED STATES PATENT AND TRADEMARK OFFICE
CERTIFICATE OF CORRECTION

| | |
|---|---|
| PATENT NO. | : 8,071,249 B2 |
| APPLICATION NO. | : 12/840592 |
| DATED | : December 6, 2011 |
| INVENTOR(S) | : Yoshinobu Hasuka et al. |

It is certified that error appears in the above-identified patent and that said Letters Patent is hereby corrected as shown below:

On the Title Page, item [62]:

Replace the Related U.S. Application Data with the following:

--(62) Division of application No. 12/085,167, filed 16 May 2008, now abandoned, which is a 371 national phase application of PCT/JP2006/324038 filed on Nov. 24, 2006.--

Signed and Sealed this

Fifteenth Day of January, 2013

David J. Kappos
*Director of the United States Patent and Trademark Office*